United States Patent [19]
Friese et al.

[11] Patent Number: 5,962,540
[45] Date of Patent: Oct. 5, 1999

[54] ONE-COMPONENT OR TWO-COMPONENT REACTIVE ADHESIVE

[75] Inventors: Carsten Friese, Hamburg; Frank Bergmann, Hannover; Thomas Huver, Duesseldorf, all of Germany

[73] Assignee: Henkel Kommanditgesellschaft auf Aktien, Duesseldorf, Germany

[21] Appl. No.: 08/776,728

[22] PCT Filed: Jul. 25, 1995

[86] PCT No.: PCT/EP95/02961

§ 371 Date: Mar. 3, 1997

§ 102(e) Date: Mar. 3, 1997

[87] PCT Pub. No.: WO96/04347

PCT Pub. Date: Feb. 15, 1996

[30] Foreign Application Priority Data

Aug. 3, 1994 [DE] Germany ............................. 44 27 471

[51] Int. Cl.$^6$ ..................................................... C08J 9/02
[52] U.S. Cl. ................... 521/128; 526/218.1; 526/219.6
[58] Field of Search ......................... 521/128; 526/218.1, 526/219.6

[56] References Cited

U.S. PATENT DOCUMENTS

| | | | |
|---|---|---|---|
| 3,579,163 | 5/1971 | Cronin | 336/94 |
| 3,986,253 | 10/1976 | Harris | 29/598 |
| 4,439,600 | 3/1984 | Moran | 528/392 |
| 4,695,596 | 9/1987 | Berkowitz | 521/137 |
| 4,918,119 | 4/1990 | Seltman et al. | 523/461 |
| 5,252,617 | 10/1993 | Werner et al. | 521/56 |

FOREIGN PATENT DOCUMENTS

| | | |
|---|---|---|
| 0 304 675 | 3/1989 | European Pat. Off. . |
| 0 408 048 | 1/1991 | European Pat. Off. . |
| 0 562 394 | 9/1993 | European Pat. Off. . |
| 2 269 267 | 12/1975 | France . |
| 43 40 095 | 11/1993 | Germany . |
| 44 41 463 | 6/1995 | Germany . |
| 4441463 | 6/1995 | Germany . |
| WO86/01153 | 2/1986 | WIPO . |

OTHER PUBLICATIONS

CA 941495, Feb., 1974.

*Primary Examiner*—Robert Dawson
*Assistant Examiner*—D. Aylward
*Attorney, Agent, or Firm*—Ernest G. Szoke; Wayne C. Jaeschke; Stephen D. Harper

[57] ABSTRACT

A reaction adhesive becomes porous after hardening. This allows both small and larger gaps to be sealed between the bonded substrates, as the liquid adhesive has a low to medium viscosity and the hardened glue shows a marked volume increase. Reaction adhesives based on (meth) acrylates and that contain azo-bis-isobutyronitrile as initiator and expanding agent are preferably used. The disclosed reaction adhesive is preferably used for gluing reactive coils.

30 Claims, No Drawings

ONE-COMPONENT OR TWO-COMPONENT REACTIVE ADHESIVE

FIELD OF THE INVENTION

This invention relates to a one-component or two-component reactive adhesive, to its production and to its use.

BACKGROUND OF THE INVENTION

Low-viscosity to medium-viscosity adhesives, for example Sicomet 85, Sicomet 77, omniFit 15 M and omniFit 200 M, are used for bonding substrates with narrow to medium-sized gaps (0.01 to 0.2 mm), according to the particular requirements and the material classification. These adhesives have a Brookfield viscosity of up to about 1,000 mPas at 20° C. They are eminently suitable for filling the entire gap, particularly when the parts to be bonded are fitted together before application of the adhesive and good capillary effects are required for completely wetting the entire substrate surfaces. Where relatively large gaps (0.2 to 2 mm) or spaces are to be bridged or filled, high-viscosity or thixotropicized adhesives with gap-bridging properties (for example metallon FL and Stabilit express) are used. The viscosity of metallon FL is 110,000 to 120,000 mPas for the binder and 15,000 to 30,000 for the hardener (see Henkel KGaA's technical information sheet on "Sicomet/omniFit"). In view of the high viscosity or limited capillary effects, substrates which have already been fitted together with relatively large gaps are difficult or impossible to bond by subsequent application of adhesive.

The adhesives mentioned above are unsuitable for bonding substrates which have already been fitted together both with small and with relatively large gaps or spaces in between either because of inadequate capillary effects or incomplete wetting of the substrate surfaces or through the absence of gap-bridging or space-filling properties.

Against the background or this prior art, the problem addressed by the present invention was to provide low-viscosity to medium-viscosity reactive adhesives with gap-bridging or space-filling adhesive properties.

SUMMARY OF THE INVENTION

The solution provided by the invention is defined in the claims, lying essentially in a one-component or two-component reactive adhesive which becomes porous on curing.

DETAILED DESCRIPTION OF THE INVENTION

The viscosity of the reactive adhesive before curing is below 10, preferably below 2 and more preferably below 0.5 Pa.s at 20° C., as measured with a Physica cone/plate viscosimeter (DIN 54453). It is preferably above 1 mPas.

The porosity of the cured adhesive is at least 3% by volume, preferably at least 10% by volume and more preferably at least 20% by volume. Porosity is determined by pouring the liquid adhesive into a test tube and measuring the height of the column of liquid. The adhesive is then cured, for example by heating. After curing, the height of the now solid adhesive in the test tube is determined. The difference between the height thus determined and the starting height is a measure of the porosity of the adhesive.

The pore system is produced by adding a blowing agent to the reactive adhesive. A blowing agent in the context of the invention is understood to be a substance which forms a gas during the curing process. In order to guarantee a relation between curing and the formation of a gas, the blowing agent should simultaneously be an initiator or catalyst for the curing reaction. The blowing agent may be mixed with the other components of the adhesive long before it is used (one-component adhesive). However, it may also be added shortly before the basic mixture is used, best in powder form (two-component adhesive). One example of such a substance is azo-bis-isobutyronitrile (AIBN). On heating, azo-bis-isobutyronitrile decomposes into nitrogen, which forms the pore system, and radicals which initiate the polymerization, for example of acrylates. Surprisingly, foamed cured adhesive polymers are thus obtained. Different quantities of gas bubbles or voids are obtained according to the curing temperature and the concentration of the blowing agent. It may be useful in some cases to add foam stabilizers.

The basic mixture of the reactive adhesive is preferably based on radical-polymerizable monomers containing an olefinic C—C double bond, more particularly (meth) acrylates. (Meth)acrylates particularly suitable for adhesives are described in DE 43 40 095. Accordingly, one or more of the radical-polymerizable compounds (A) and/or (B) corresponding to the following general formula:

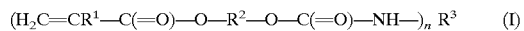

$$(H_2C=CR^1-C(=O)-O-R^2-O-C(=O)-NH-)_n R^3 \quad (I)$$

in which $R^1$ is hydrogen or a methyl group, $R^2$ is a linear or branched alkyl group containing 2 to 6 carbon atoms or alkylene oxides containing 4 to 21 carbon atoms and n=1, 2 or 3;

(A) where n=1, $R^3$ is an aryl group containing 6 to 18 carbon atoms, a linear or branched alkyl group containing 1 to 18 carbon atoms or a cycloalkyl group containing 3 to 12 carbon atoms;

(B) where n=2, $R^3$ is

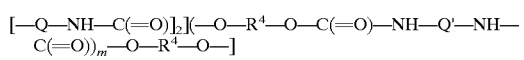

$$[-Q-NH-C(=O)]_2[(-O-R^4-O-C(=O)-NH-Q'-NH-C(=O))_m-O-R^4-O-]$$

in which m=0 to 10 and $R^4$ is a) a polycaprolactone diol residue b) a polytetrahydrofurfuryl diol residue or c) a diol residue derived from a polyesterdiol characterized by a C:O-ratio of >2.6, a C:H ratio of <10 and a molecular weight of 1,000 to 20,000 or where n=3, $R^3$ is

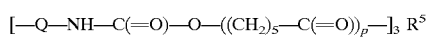

$$[-Q-NH-C(=O)-O-((CH_2)_5-C(=O))_p-]_3 R^5$$

in which $R^5$ is a triol residue of a linear or branched trihydric alcohol containing 3 to 6 carbon atoms and p=1 to 10 and Q and Q' independently of one another represent aromatic, aliphatic or cycloaliphatic groups containing 6 to 18 carbon atoms which are derived from diisocyanates or diisocyanate mixtures, and optionally one or more (meth)acrylate comonomers (C) are also suitable for the purposes of the invention, the composition containing 0 to 80% by weight of one or more of the compounds (B) and 100 to 20% by weight of one or more of the compounds (A) or 100 to 20% by weight of a mixture of one or more of the compounds (A) and (C), or 2 to 80% by weight of one or more of the compounds (B) and 98 to 20% by weight of one or more of the compounds (C), based on the total quantity of (A)+(B)+(C).

The compounds corresponding to formula (I) may be obtained in known manner by reacting an acrylate ($R^1$=H) or methacrylate ($R^1$=CH$_3$) containing hydroxyl groups in the ester group with compounds containing isocyanate groups to form a urethane group.

According to the invention, the acrylates or methacrylates are hydroxyalkyl acrylates or methacrylates, the alkyl groups optionally being linear or branched and containing between 2 and 6 carbon atoms. According to the invention, the esters of acrylic acid and methacrylic acid with polyethylene glycol and/or polypropylene glycol may also be used. Corresponding acrylates or methacrylates contain 4 to 21 carbon atoms in the ester group corresponding to 2 to 10 ethylene oxide units and 1 to 7 propylene oxide units. The production of such esters is known to the expert.

Component (A):

Urethane (meth)acrylates corresponding to formula (I) with n=1 are known and may be obtained in known manner from the basic isocyanates by reaction with the corresponding hydroxyfunctional (meth)acrylates corresponding to the following general formula:

$$H_2C=CR^1-C(=O)-O-R^2-OH$$

Relevant processes are described in WO-A-86/01153 and in U.S. Pat. No. 4,439,600.

Suitable acrylates or methacrylates are those for which $R^2$ contains an ethylene, propylene, isopropylene, n-butylene or isobutylene group or 4 to 7 ethylene oxide or propylene oxide units.

However, hydroxyethyl acrylate, hydroxyethyl methacrylate, 2-hydroxypropyl acrylate, 2-hydroxypropyl methacrylate, 3-hydroxypropyl acrylate, 3-hydroxypropyl methacrylate, 6-hydroxyhexyl acrylate, 6-hydroxyhexyl methacrylate, polyethylene glycol acrylate, polyethylene glycol methacrylate, polypropylene glycol acrylate and polypropylene glycol methacrylate are preferred for the reaction of the isocyanates with the hydroxyfunctional acrylates or methacrylates.

The linear or branched alkyl groups containing 1 to 8 carbon atoms for $R^3$ are, in particular, methyl, ethyl, propyl, isopropyl, n-butyl, isobutyl, tert.butyl, pentyl, isopentyl, neopentyl or hexyl groups.

The cycloalkyl groups containing 3 to 12 carbon atoms are preferably those selected from the group consisting of cyclopropyl, cyclobutyl, cyclopentyl, cyclohexyl and cycloheptyl groups.

Aromatic groups containing 6 to 18 carbon atoms include in particular the phenyl group, the 2-toluenyl group, the 4-toluenyl group and the xylenyl group which is introduced by reaction of the hydroxyfunctional (meth)acrylates with the corresponding isocyanates.

Component (B):

Where n=2, the compounds corresponding to general formula (I) are reaction products of the above-mentioned hydroxyfunctional acrylates or methacrylates with isocyanates which are obtainable by reacting suitable diols with diisocyanates. The diols are a) polycaprolactone diols, b) polytetrahydrofurfuryl diols and c) special polyester diols. The molar ratio in the reaction of the diols with the diisocyanates may vary from 1:2 to 1:1.1.

a) Polycaprolactone diols are obtainable in known manner by ring-opening polymerization of caprolactone with suitable diols, the ratio of caprolactone to the diol being from 1 to 20:1, i.e. from 2 to 40 moles of caprolactone per mole of diol. The molecular weight of the polycaprolactone diols is between 200 and 4,000.

Particularly suitable diols are linear or branched dihydric alcohols containing 2 to 6 carbon atoms which are selected from the group consisting of ethylene glycol, propane-1,2-diol, propane-1,3-diol, butane-1,2-, -1,3- or -1,4-diol, pentane-1,5-diol, 2-methylbutane-1,4-diol, 2,2-dimethyl propane-1,3-diol, hexane-1,2- or -1,6-diol, decane-1,10-diol.

The reaction products of the diol and the caprolactone are then reacted with aromatic, aliphatic or cyclic diisocyanates by processes known to the expert. Suitable diisocyanates, from which Q and—independently thereof—also Q' are derived, are selected from toluene 2,4-diisocyanate, toluene 2,6-diisocyanate, 4,4'-diphenyl methane diisocyanate (MDI), 4,4'-dicyclohexyl diisocyanate, m- and p-tetramethyl xylene diisocyanate, 3-isocyanatomethyl-3,5,5-trimethyl cyclohexyl isocyanate (isophorone diisocyanate), hexamethylene diisocyanate, 1,5-naphthylene diisocyanate, dianisidine diisocyanate, di-(2-isocyanatoethyl)-bicyclo-[2.2.1]-hept-5-ene-2,3-dicarboxylate, 2,2,4- and 2,4,4-trimethyl hexamethylene diisocyanate and mixtures thereof.

The reaction product of the diol, the caprolactone and the diisocyanate is then reacted in known manner with the hydroxyfunctional acrylate or methacrylate to form the polyurethane (meth)acrylate.

b) The compounds (B) derived from polytetrahydrofurfuryl diol are prepared in basically the same way as described in a). Polytetrahydrofurfuryl diol is first reacted with one of the diisocyanates mentioned above under a) and the reaction product is reacted with the hydroxyfunctional acrylates or methacrylates mentioned under a) to form the polyurethane (meth)acrylate. Information on the process for reacting diols with diisocyanates can be found in the relevant specialist literature known to the expert. The molecular weight of the products is between 200 and 4,500.

c) Particularly good properties, particularly in regard to hydrophobicization, are achieved by using polyurethane (meth)acrylates based on special polyester diols. These polyurethane (meth)acrylates have a particular elasticizing effect.

These polyurethane (meth)acrylates are compounds corresponding to general formula II:

$$[H_2C=CR_1-C(=O)-O-R_2-O-C-(=O)-NH-Q-NH-C(=O)]_2(-O-R^4-O-C(=O)-NH-Q'-NH-C(=O))_m-O-R^4-O-] \quad (II)$$

in which $R_1$, $R_2$, Q and Q' are as defined above.

$R^4$ corresponds to polyester diol residues derived from polyester diols which are characterized by a C:O ratio of >2.6 and preferably >3.0 and a C:H ratio of <10. In addition, these polyester diols are distinguished by a molecular weight of 1,000 to 20,000 and, more particularly, 1,000 to 10,000.

These special polyester diols are obtained by reacting long-chain diols, more particularly dimer diol (hydrogenated dimer fatty acid), with relatively short-chain dicarboxylic acids containing 4 to 8 carbon atoms or anhydrides thereof, more particularly succinic acid or succinic anhydride. The polyester diols may also be obtained by reacting relatively short-chain diols containing 4 to 8 carbon atoms, more particularly hexane-1,6-diol, with long-chain fatty acids, more particularly a dimer fatty acid mixture of dimerized fatty acids of acyclic and cyclic dicarboxylic acids containing on average 36 carbon atoms. However, mixtures of long-chain diols with relatively short-chain diols, more particularly mixtures of hexanediol and polyethylene glycol or of dimer diol and diethylene glycol, may also be used.

In general, particularly preferred diols are linear or branched $C_{2-44}$ alkyl diols, such as ethylene glycol, 1,2- or 1,3-propylene glycol, butane-1,2-, -1,3- or -1,4-diol, neopentyl glycol, hexane-1,2- or -1,6-diol, decane-1,10-diol, octadecane-1,12-diol. However, cyclic $C_{6-44}$ alkyl diols may also be used.

Diols containing ether groups, for example di-, tri- or tetraethylene or propylene glycol, or oligomeric homologs thereof are also preferred.

In general, particularly preferred dicarboxylic acids are linear or branched $C_{2-44}$ alkyl dicarboxylic acids, such as oxalic acid, malonic acid, succinic acid, glutaric acid, adipic acid, pimelic acid, suberic acid, azelaic acid, nonane dicarboxylic acid, decane dicarboxylic acid, undecane dicarboxylic acid or technical mixtures thereof. Unsaturated $C_{4-44}$ dicarboxylic acids, such as maleic acid, fumaric acid, itaconic acid or aconitic acid, may also be used for the reaction with the diols.

The esterification reaction may be carried out by methods known per at elevated temperature in a suitable solvent and in the presence of a catalyst, the water of reaction being azeotropically removed. Tin(II) octoate is preferably used as the catalyst while xylene is preferably used as the solvent.

The polyester diols thus obtained are then reacted with one of the diisocyanates mentioned above under a) and the product of this reaction is subsequently reacted with the hydroxyfunctional acrylates or methacrylates mentioned above under a) to form the polyurethane (meth)acrylate.

One or more of these polyurethane (meth)acrylates based on the special polyester diols may be used in admixture with activators and optionally other typical additives as an adhesive composition.

The compounds corresponding to general formula (I) with n=3 are reaction products of the above-mentioned hydroxyfunctional acrylates or methacrylates with isocyanates which are obtainable by reacting suitable linear or branched trihydric alcohols (triols) containing 3 to 6 carbon atoms with caprolactone and subsequent reaction with diisocyanates.

Polycaprolactone triols are obtainable in known manner by ring-opening polymerization of caprolactone with suitable triols, the ratio of caprolactone to triol being from 1 to 10:1, i.e. 3 to 30 moles of caprolactone per mole of triol. Suitable triols are, in particular, those selected from the group consisting of glycerol, butane-1,2,4-triol, trimethylol propane (2-hydroxymethyl-2-ethylpropane-1,3-diol) and trimethylol ethane (2-methyl-2-hydroxymethylpropane-1,3-diol).

The reaction products of the triol and the caprolactone are then reacted in known manner with the diisocyanates mentioned under a). The reaction product of the triol, the caprolactone and the diisocyanate is then reacted in known manner with the hydroxyfunctional acrylate or methacrylate to form the polyurethane (meth)acrylate.

Component (C):

The adhesive composition may additionally contain one or more acrylate or methacrylate comonomers (C). These monomers (C) are selected from allyl acrylate, allyl methacrylate, methyl acrylate, methyl methacrylate, 2-hydroxyethyl acrylate, 2-hydroxyethyl methacrylate, 2- or 3-hydroxypropyl acrylate, 2- or 3-hydroxypropyl methacrylate, 6-hydroxyhexyl acrylate, 6-hydroxyhexyl methacrylate, benzyl methacrylate, phenylethyl methacrylate, 2-phenoxyethyl methacrylate, morpholinoethyl methacrylate, glycidyl methacrylate, piperidyl acrylamide, neopentyl methacrylate, cyclohexyl methacrylate, tert.butyl methacrylate and tetrahydrofurfuryl methacrylate or mixtures thereof.

The composition according to the invention preferably contains 10 to 70% by weight of one or more of the compounds (B) and 90 to 30% by weight of one or more of the compounds (A) and/or (C), based on the total quantity of (A)+(B)+(C).

The course of the reaction and/or the open time may be controlled in known manner using inhibitors and/or stabilizers against premature initiation of the radical reaction. The quantity in which they are used is determined by the stated purpose. In individual cases, it may readily be determined by expert considerations and/or by preliminary tests. The quantities of stabilizers used will normally not exceed a few percent—for example around 2 to 5% by weight—of the mixture as a whole and, in general, will be below 1% by weight, based on the mixture as a whole.

The invention provides for the formulation of optimized adhesive compositions. Without departing from the scope of the invention, soluble and/or insoluble fillers, elasticizing agents, activators, pigments, primers and the like may be used without any adverse effect on the performance of the compositions according to the invention. However, the reactive adhesive according to the invention is preferably solvent-free.

The stability in storage of the reactive adhesive according to the invention corresponds to that of the known reactive adhesive with no added blowing agent.

The adhesive strength of such adhesives may be determined by tensile shear tests and is again dependent upon the choice of the monomers or oligomers, the curing temperature and the porosity.

The bonding of a coil to a ferrite core to produce a choke is described as a typical application. In this particular application, small gaps and relatively large spaces occur at regular intervals through the geometry or the coil and the cylindrical shape of the ferrite core, depending on the size of the choke. By suitably selecting the thermosetting, foaming one-component reactive adhesive in regard to viscosity, activation temperature and reaction time and by suitably applying the adhesive, substrates of the type in question can be bonded quickly and with high strengths. Of particular importance in this regard is the fact that the viscosity of the monomers can be distinctly reduced by the addition of a few percent of AIBN. For example, the viscosity of a monomer mixture of 60% of an 80% polyurethane methacrylate (PUMA 2), 25% of hydroxypropyl methacrylate and 15% of benzyl methacrylate at 20° C. is 4,500 mPa.s without AIBN and 3,400 mPa.s after the addition of 2% of AIBN.

The invention is illustrated by the following experiments:
Measurements:

Viscosity was measured with a cone-plate viscosimeter. Tensile shear strength (TSS) was measured in accordance with DIN 53283 on steel/steel (corundum-blasted). The increase in volume or foaming of liquid adhesive to cured adhesive was determined in a test tube filled with 3 g of adhesive by measuring the difference in length.
General Production Procedure:

The monomer(s) is/are introduced first. Azo-bis-isobutyronitrile (AIBN) is dissolved by stirring for 1 h at room temperature. The polyurethane dimethacrylate—where it is a component of the adhesive—is then added with stirring, followed by stirring for 2 h to homogeneity. The adhesives thus produced are stable in storage at room temperature, but are preferably stored under cool conditions. Curing is only observed above 40° C.

EXAMPLES

The polyurethane dimethacrylates PUMA 1 and PUMA 2 used in the Examples are employed in the form of 80% solutions in hydroxypropyl methacrylate.

They were prepared as follows:
Polyurethane methacrylate mixtures based on polycaprolactone diol and triol (PUMA 1)
Adducts:

540 g (1 mole) of polycaprolactone triol, MW 540 (CAPA 305, a product of Solvay)

1376 g (0.65 mole) of polycaprolactone diol, MW 2,000 (CAPA 220, a product of Solvay)

748 g (4.3 moles) of toluene 2,4-diisocyanate (Desmodur T 100, a product of Bayer AG)

1430 g (9.9 moles) of hydroxypropyl methacrylate (HPMA 97, a product of Röhm)

1.23 g of hydroquinone monomethyl ether (a product of Fluka)
Production procedure:

The polyols are introduced into a stirred reactor and heated to 50° C.

The toluene diisocyanate (TDI) is added dropwise over a period of 30 minutes, the temperature of the mixture not exceeding 55° C. After the addition, the mixture is heated for 45 minutes to 60° C. until the NCO content has reached 6.8%. The hydroquinone monomethyl ether and the HPMA are added and the mixture is heated to 80° C. until the NCO content is <0.1%. The reaction product is an 80% solution of the polyurethane (meth)acrylate in (excess) HPMA.

For PUMA 2, MDI was used instead of TDI.

Example 1

98% triethylene glycol dimethacrylate/2% AIBN viscosity: 10 mPa.s;

TSS (curing: 1 h/120° C.): 8.9 N/mm$^2$;

increase in volume for a filling level of 35 mm (corresponding to 3 g of adhesive) after 80 seconds at 100° C.; 15 mm (corresponding to 43%).

Example 2

98% tetrahydrofurfuryl methacrylate/2% AIBN viscosity 3 mPa.s;

TSS (curing: 1 h/120° C.): 3.3 N/mm$^2$;

increase in volume for a filling level of 36 mm (corresponding to 3 g of adhesive) after 120 seconds at 100° C.: 1 mm (corresponding to 3%).

Example 3

98% hydroxypropyl methacrylate/2% AIBN viscosity: 10 mPa.s;

TSS (curing: 3 h/80° C.): 15.9 N/mm$^2$;

TSS (curing: 1 h/120° C.): 9.3 N/mm$^2$;

TSS (curing: 0.5 h/90° C.): 5.9 N/mm$^2$;

increase in volume for a filling level of 36 mm (corresponding to 3 g of adhesive) after 110 seconds at 100° C.: 5 mm (corresponding to 14%).

Example 4

15% benzyl methacrylate/73% hydroxypropyl methacrylate/10% PUMA 1 (80%) 2% AIBN viscosity: 18 mPa.s;

TSS (curing: 3 h/80° C.): 15.7 N/mm$^2$;

increase in volume for a filling level of 35 mm (corresponding to 3 g of adhesive) after 110 seconds at 100° C.: 13 mm (corresponding to 37%).

Example 5

15% benzyl methacrylate/63% hydroxypropyl methacrylate/20% PUMA 1 (80%)/2% AIBN viscosity: 40 mPa.s;

TSS (curing: 3 h/80° C.): 14 N/mm$^2$;

TSS (curing: 0.5 h/90° C.): 7.6 N/mm$^2$;

TSS (curing: 1 h/120° C.): 10.7 N/mm$^2$;

increase in volume for a filling level of 35 mm (corresponding to 3 g of adhesive) after 110 seconds at 100° C.: 5 mm (corresponding to 15%).

Example 6

15% benzyl methacrylate/53% hydroxypropyl methacrylate/30% PUMA 1 (80%)/2% AIBN viscosity: 94 mPa.s;

TSS (curing: 3 h/80° C.): 14.5 N/mm$^2$;

increase in volume for a filling level of 35 mm (corresponding to 3 g of adhesive) after 110 seconds at 100° C.: 3 mm (corresponding to 9%).

Example 7

15% benzyl methacrylate/43% hydroxypropyl methacrylate/40% PUMA 1 (80%)/2% AIBN viscosity: 225 mPa.s;

TSS (curing: 1 h/120° C.): 13 N/mm$^2$;

TSS (curing: 3 h/80° C.): 15.6 N/mm$^2$;

increase in volume for a filling level of 35 mm (corresponding to 3 g of adhesive) after 95 seconds at 100° C.: 6 mm (corresponding to 17%).

Example 8

15% benzyl methacrylate/33% hydroxypropyl methacrylate/50% PUMA 1 (80%)/2% AIBN viscosity: 486 mPa.s;

TSS (curing: 3 h/80° C.): 14.2 N/mm$^2$;

increase in volume for a filling level of 34 mm (corresponding to 3 g of adhesive) after 95 seconds at 100° C.: 7 mm (corresponding to 21%).

Example 9

15% benzyl methacrylate/25% hydroxypropyl methacrylate/58% PUMA 1 (80%)/2% AIBN viscosity: 1084 mPa.s;

TSS (curing: 1 h/120° C.): 18.7 N/mm$^2$;

increase in volume for a filling level of 33 mm (corresponding to 3 g of adhesive) after 95 seconds at 100° C.: 5 mm (corresponding to 15%).

Example 10

15% benzyl methacrylate/25% hydroxypropyl methacrylate/58% PUMA 2 (80%)/2% AIBN viscosity: 3360 mPa.s;

TSS (curing: 1 h/120° C.): 15.6 N/mm$^2$;

increase in volume for a filling level of 32 mm (corresponding to 3 g of adhesive) after 95 seconds at 100° C.: 6 mm (corresponding to 19%).

Example 11

Bonding of chokes a) The ferrite core and coil are fitted and vertically aligned. 10 mg of adhesive (Example 3) are then introduced into the gap. After 30 to 60 seconds, the ferrite core inside the coil is completely wetted and the adhesive is oven-cured for 15 minutes at 100° C.

The adhesive composition of Example 3 may be replaced by the composition of Example 4. Curing temperature: 140° C./60 seconds.

b) Alternatively to Example 11 a) the ferrite core may also be completely wetted with 10 mg of adhesive (Example 5) before assembly. After assembly, the adhesive is cured as described in 11 a).

c) Instead of oven curing, however, a voltage (for example 6 V) may also be applied to the coil. A current is allowed to flow for 5 to 10 seconds, after which the coil is left to cool to room temperature.

After choosing the right viscosity, relatively large chokes with relatively large gaps can be bonded by the methods described in 11 a) b) and c).

Example 12

The initiator and blowing agent may also be present in the form of separate components. Benzoyl peroxide, for example, was used as initiator while the blowing agent was selected from substances typically used for foams. At a curing temperature of 80° C., foaming occurs after 5 minutes at the earliest. Significant expansion is obtained with azodicarbonamide, for example, as the blowing agent. Rapid and sufficient foaming after 40 to 90 seconds is obtained in every case at a curing temperature of 120° C. Tests were conducted inter alia with p-toluene sulfonic acid hydrazide, an HDI/acetic acid adduct and—as a physical blowing agent—gas-filled hollow beads (microbeads).

What is claimed is:

1. A reactive adhesive that becomes porous on heating, which comprises:
   at least one reactant selected from the group consisting of acrylates, methacylates and mixtures thereof; and
   at least one blowing agent.

2. The reactive adhesive of claim 1, wherein said blowing agent is also an initiator.

3. The reactive adhesive of claim 2, comprising triethylene glycol dimethacrylate and azo-bis-isobutyronitrile.

4. The reactive adhesive of claim 2, comprising about 98 wt. % triethylene glycol dimethacrylate and about 2 wt. % azo-bis-isobutyronitrile.

5. The reactive adhesive of claim 2, comprising tetrahydrofurfuryl methacrylate and azo-bis-isobutyronitrile.

6. The reactive adhesive of claim 2, comprising about 98 wt. % tetrahydrofurfuryl methacrylate and about 2 wt. % azo-bis-isobutyronitrile.

7. The reactive adhesive of claim 2, comprising hydroxypropyl methacrylate and azo-bis-isobutyronitrile.

8. The reactive adhesive of claim 2, comprising about 98 wt. % hydroxypropyl methacrylate and about 2 wt. % azo-bis-isobutyronitrile.

9. The reactive adhesive of claim 1, further comprising a reactant selected from the group consisting of polyurethane acrylates, polyurethane methacrylates and mixtures thereof.

10. The reactive adhesive of claim 9, comprising:
    about 10 to about 70 wt. % of a reactant selected from the group consisting of polyurethane acrylates, polyurethane methacrylates and mixtures thereof; and
    about 90 to about 30 wt. % of combined blowing agent and at least one reactant selected from the group consisting of acrylates, methacylates and mixtures thereof.

11. The reactive adhesive of claim 9, comprising benzyl methacrylate, hydroxypropyl methacrylate, polyurethane methacrylate and azo-bis-isobutyronitrile.

12. The reactive adhesive of claim 9, comprising about 15 wt. % benzyl methacrylate, about 73 wt. % hydroxypropyl methacrylate, about 10 wt. % of about 80 wt. % polyurethane methacrylate in hydroxypropyl methacrylate and about 2 wt. % azo-bis-isobutyronitrile.

13. The reactive adhesive of claim 9, comprising about 15 wt. % benzyl methacrylate, about 63 wt. % hydroxypropyl methacrylate, about 20 wt. % of about 80 wt. % polyurethane methacrylate in hydroxypropyl methacrylate and about 2 wt. % azo-bis-isobutyronitrile.

14. The reactive adhesive of claim 9, comprising about 15 wt. % benzyl methacrylate, about 53 wt. % hydroxypropyl methacrylate, about 30 wt. % of about 80 wt. % polyurethane methacrylate in hydroxypropyl methacrylate and about 2 wt. % azo-bis-isobutyronitrile.

15. The reactive adhesive of claim 9, comprising about 15 wt. % benzyl methacrylate, about 43 wt. % hydroxypropyl methacrylate, about 40 wt. % of about 80 wt. % polyurethane methacrylate in hydroxypropyl methacrylate and about 2 wt. % azo-bis-isobutyronitrile.

16. The reactive adhesive of claim 9, comprising about 15 wt. % benzyl methacrylate, about 33 wt. % hydroxypropyl methacrylate, about 50 wt. % of about 80 wt. % polyurethane methacrylate in hydroxypropyl methacrylate and about 2 wt. % azo-bis-isobutyronitrile.

17. The reactive adhesive of claim 9, comprising about 15 wt. % benzyl methacrylate, about 25 wt. % hydroxypropyl methacrylate, about 58 wt. % of about 80 wt. % polyurethane methacrylate in hydroxypropyl methacrylate and about 2 wt. % azo-bis-isobutyronitrile.

18. The reactive adhesive of claim 11, wherein said acrylate is selected from the group consisting of allyl acrylate, methyl acrylate, 2-hydroxyethyl acrylate, 2-hydroxypropyl acrylate, 3-hydroxypropyl acrylate, 6-hydroxyhexyl acrylate and mixtures thereof.

19. The reactive adhesive of claim 11, wherein said methacrylate is selected from the group consisting of allyl methacrylate, methyl methacrylate, 2-hydroxyethyl methacrylate, 2-hydroxypropyl methacrylate, 3-hydroxypropyl methacrylate, 6-hydroxyhexyl methacrylate, benzyl methacrylate, phenylethyl methacrylate, 2-phenoxyethyl methacrylate, morpholinoethyl methacrylate, glycidyl methacrylate, neopentyl methacrylate, cyclohexyl methacrylate, tert-butyl methacrylate, tetrahydrofurfuryl methacrylate, triethylene glycol dimethacrylate and mixtures thereof.

20. A reactive adhesive as claimed in claim 1, wherein said adhesive has a Brookfield viscosity at 20° C. of up to about 5 Pa.s.

21. A reactive adhesive as claimed in claim 1, wherein said adhesive has a Brookfield viscosity at 20° C. of up to about 2 Pa.s.

22. A reactive adhesive as claimed in claim 1, wherein said adhesive has a Brookfield viscosity at 20° C. of up to about 0.5 Pa.s.

23. A cured reactive adhesive of 1, wherein said cured adhesive has a porosity of at least 3% by volume.

24. A cured reactive adhesive as claimed in claim 1, wherein said cured adhesive has a porosity of at least 10% by volume.

25. A cured reactive adhesive as claimed in claim 1, wherein said cured adhesive has a porosity of at least 20% by volume.

26. A reactive adhesive as claimed in claim 1, further comprising an initiator.

27. The reactive adhesive claimed in claim 1, wherein the blowing agent is added to the reactive adhesive in a concentration of about 1 to about 5 wt. %, based on the adhesive.

28. A reactive adhesive as claimed in claim 1, wherein said adhesive does not contain any solvent.

29. In a process containing a step for sealing or bonding parts, wherein the improvement comprises sealing or bonding with the reactive adhesive claimed in claim 1.

30. The Process as in claim 29, wherein at least one of said parts is a choke.

\* \* \* \* \*